Dec. 30, 1952     M. COVAN     2,623,686
TWO-WAY MAILING DEVICE
Filed April 16, 1951     3 Sheets—Sheet 1
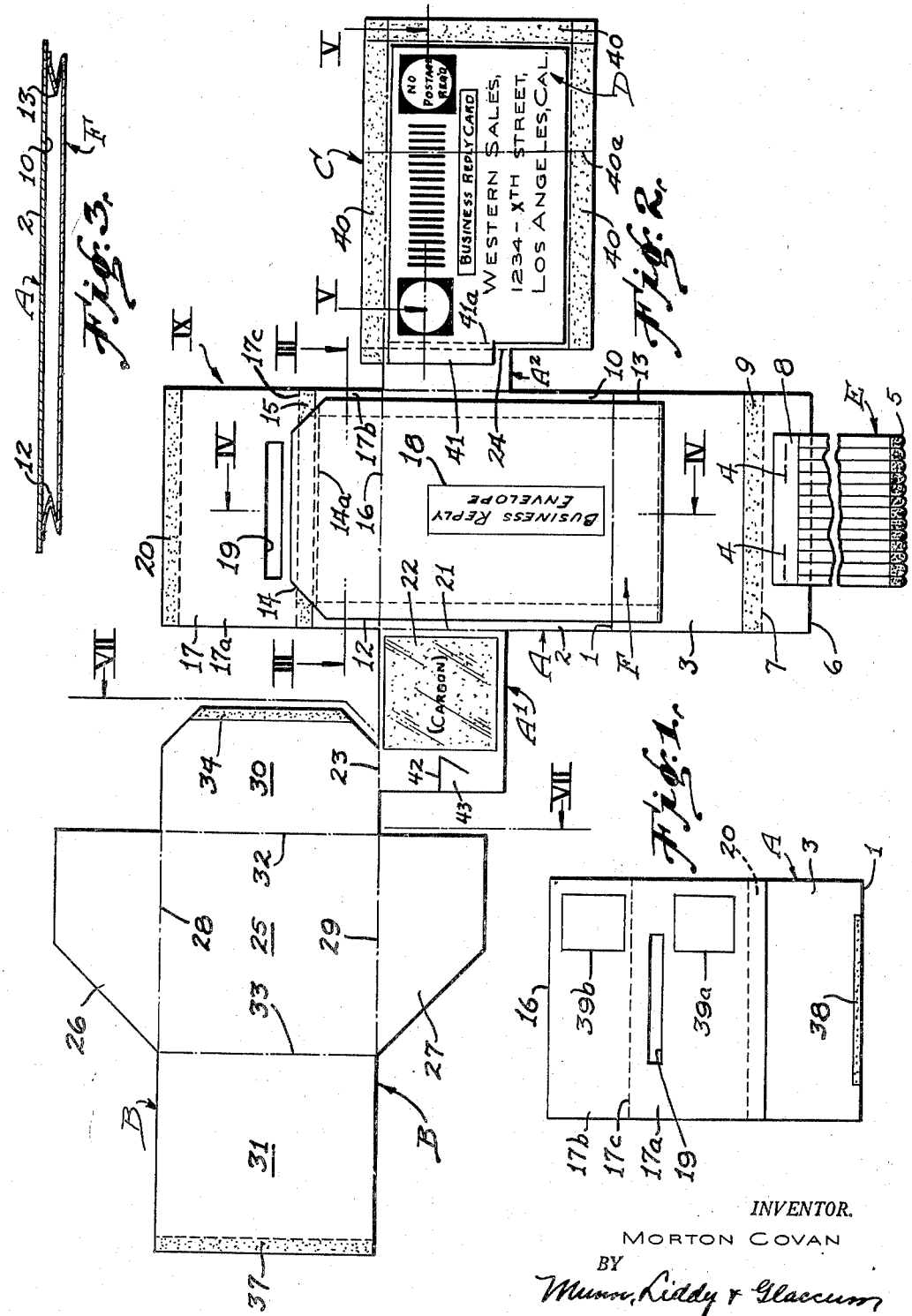
INVENTOR.
MORTON COVAN
BY
Munn, Liddy & Glaccum
ATTORNEYS

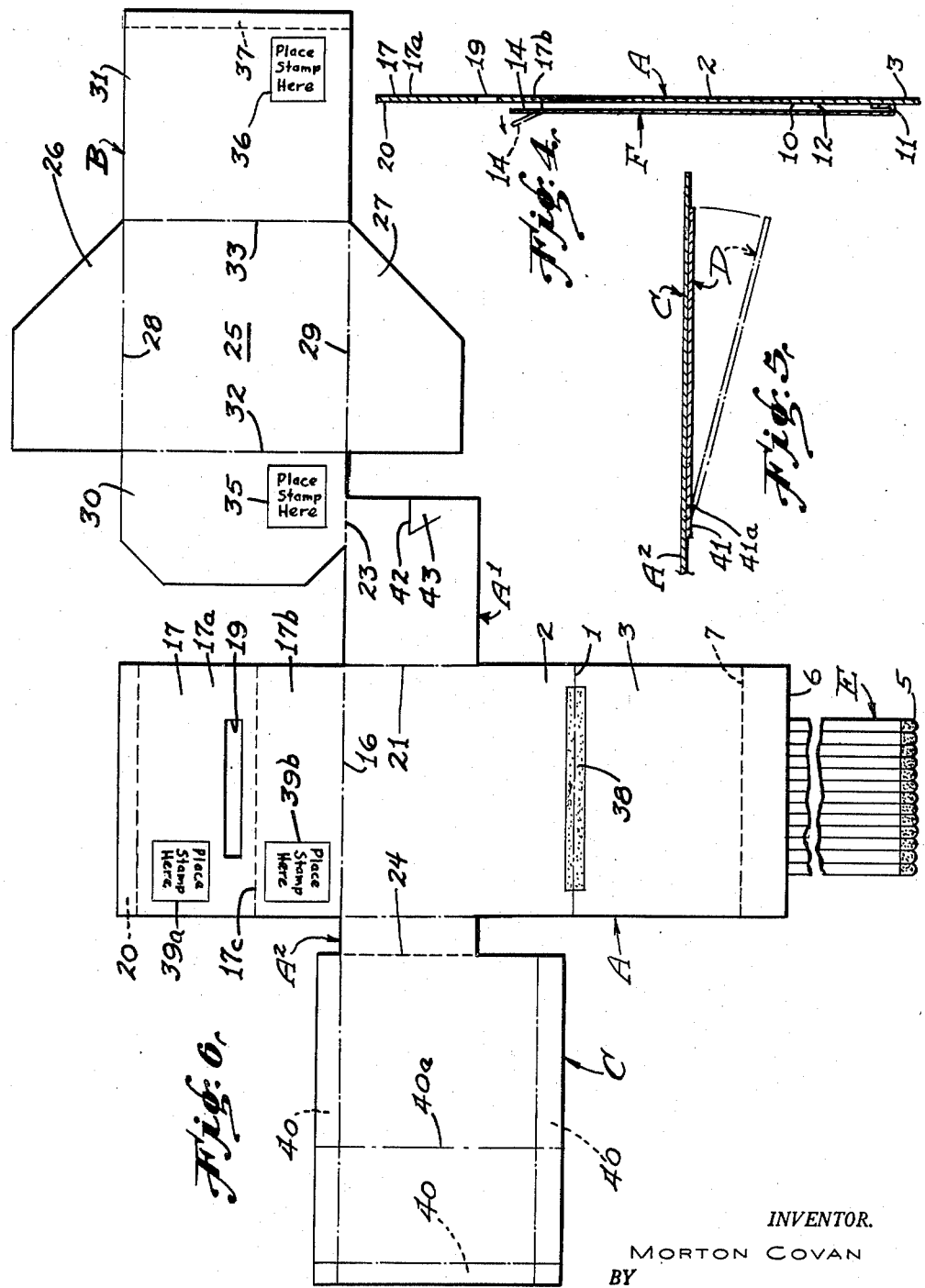

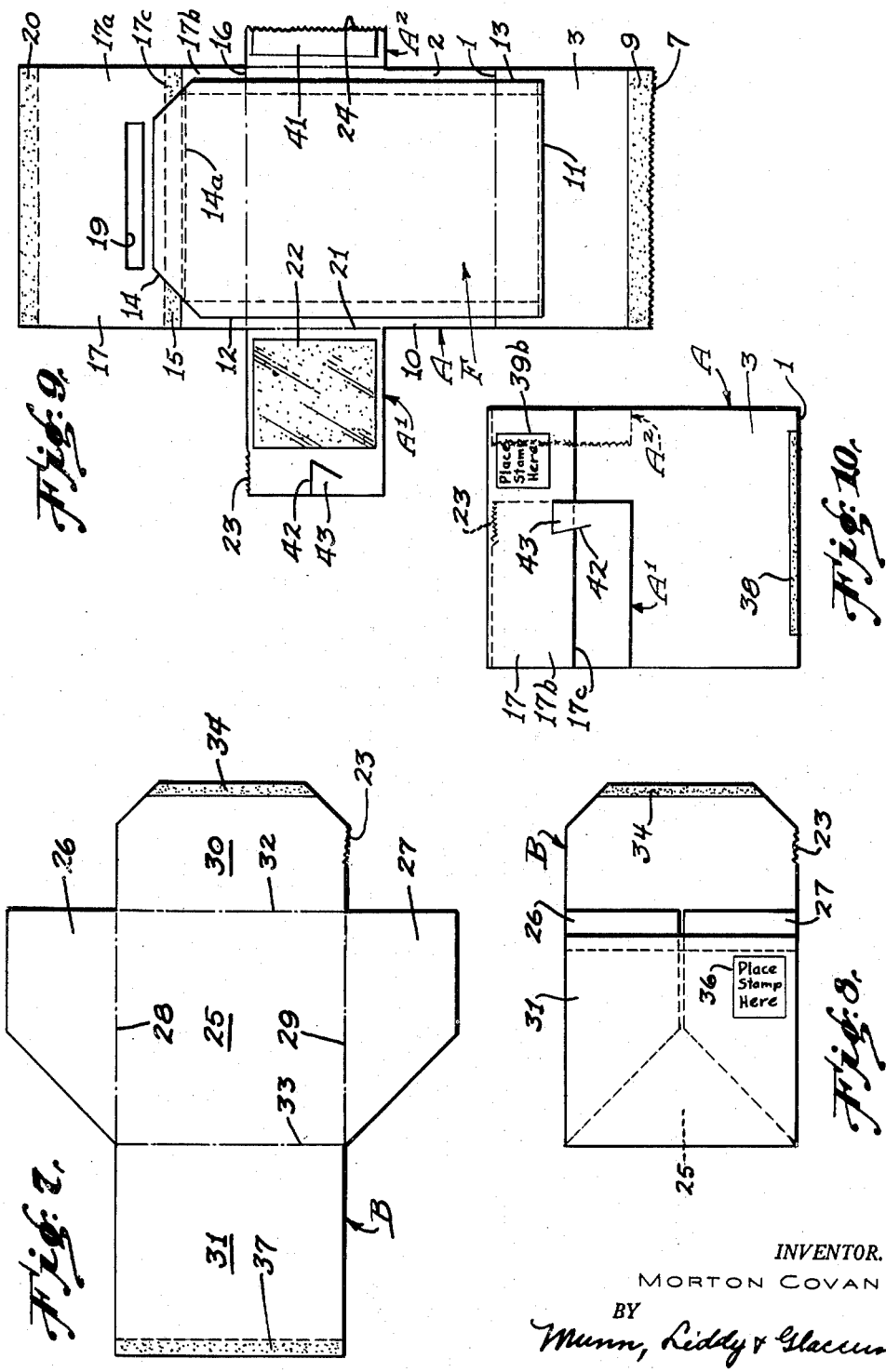

Patented Dec. 30, 1952

2,623,686

UNITED STATES PATENT OFFICE 2,623,686

TWO-WAY MAILING DEVICE

Morton Covan, Hollywood, Calif.

Application April 16, 1951, Serial No. 221,287

2 Claims. (Cl. 229—73)

Match books are widely used as an advertising medium. It is the purpose of the present invention to broaden the scope of the usefulness of the match book as a business stimulator and extend its function to that of an actual order getter, or a charity fund raiser in addition to its accepted function as institutional advertising.

The present limitations of the match book are practically self-imposed because of its size. It contains space for only a flash advertising notice. My match book invention is designed to remove the limited space handicap and use it as a significant medium of education and merchandising. Match books find their way into nearly every hand and pocket or pocket book of prospective buyers and hence should carry more than a mere flash advertisement.

A further object of my invention is to provide a match book that has various flaps and panels which may be used for additional advertising space or for giving information. Facilities for the ordering of merchandise or for the contribution of funds are provided by the addition of an envelope to the match book and it is possible to convert the match book cover itself into an envelope after the matches have been used.

It may be found advisable because of the greater scope of the match book and the consequent increase in the expense of its manufacture, to combine the advertising of two or more firms into a single match book. To make it possible for the prospective buyers to respond to several firms from a single match book, I provide several reply envelopes in each match book. Where an immediate reply by the advertiser is desired before the matches are consumed, a removable and mailable object is provided for the match book, such as a postal card which may be detached immediately and mailed to the advertiser. In this way a full advertising value is received by the one advertising on the removable and mailable object because it is a well known fact that sales response lags and is frequently entirely lost where the one using the match book must use all of the matches before making any inquiry about an item advertised by the book.

A further object of my invention is to provide a match book having the above features and which can be stamped out of a single sheet of material. I further provide a carbon paper section with the match book that can be used should the person fail to have a pen or pencil. In this case the non-ignitable end of a match in the book can be used as the writing instrument and the carbon paper used for writing on the removable and mailable object, the desired message.

Other objects and advantages will appear in the following specification, and the novel features of the device will be particularly pointed out in the appended claims.

My invention is illustrated in the accompanying drawings forming a part of this application, in which:

Figure 1 is a front elevation of the match book in folded position;

Figure 2 is a development view of the match book looking at it from the inner surface;

Figure 3 is an enlarged transverse section taken along the line III—III of Figure 2 and shows the envelope attached to the main body of the match book;

Figure 4 is a vertical section taken along the line IV—IV of Figure 2 and illustrates the same envelope shown in both Figures 2 and 3;

Figure 5 is a transverse section taken along the line V—V of Figure 2 and indicates how a mailable object is removably secured to the backing;

Figure 6 is a development view of the match book when looking at the outer face thereof;

Figure 7 is a development view of the detachable reply envelope which is shown to the left of the line VII—VII in Figure 2;

Figure 8 shows the reply envelope detached and partially folded;

Figure 9 shows the main body of the match book with the reply envelope of Figure 7 removed and the mailable object of Figure 5 and its backing also removed; and Figure 10 illustrates the main body of the match book of Figure 9 folded and ready for mailing.

In carrying out my invention, I provide a blank, shown in Figures 2 and 6, which may be made from any material desired, such as paper. Figure 2 shows the inside of the blank while Figure 6 shows the outside view. The blank comprises a main body portion A and two side flaps indicated generally at A1 and A2. The side flap A1 carries a removable and foldable envelope which is shown in blank form at B in Figures 2 and 6. The same envelope is also illustrated in Figures 7 and 8 as detached from the side flap A1 and the construction and novel features of the envelope will be set forth hereinafter.

The other side flap A2 is integral with a backing member C and this backing member is designed to carry a plurality of removable and mailable objects such as a postal card D shown in Figure 2. It is possible to remove the backing member C when it is no longer needed and this will leave only the side flap A2 as remaining attached to the main body A as clearly shown in Figure 9. The same figure also shows the side flap A1 after the envelope B is removed therefrom.

The present match book has been designed to be used by at least three advertisers with the main body A being used by one advertiser, the removable foldable envelope B being used by a second advertiser and the backing C with its removable and mailable objects being used by a third advertiser, or even more if it is found advisable. Of course, one or more advertisers could use the match book with advantage. Both the foldable envelope B and the backing C can be folded into the interior of the match book A and when the match book is folded, the parts B and C will be concealed as well as the side flaps A1 and A2. Reference to Figure 1 shows the device when all of the parts are folded into the interior of the match book. It is best to explain the construction of the main body A of the match book and then follow this with the construction of the removable and foldable envelope B and the detachable backing C with its removable and mailable objects D.

*Main body of match book*

The interior of the main body A of the match book when laid out in blank form is illustrated in Figure 2 while the exterior surface of the same body is illustrated in Figure 6. In Figure 2, I show the main body A provided with a fold line 1 that divides the body into a back portion 2 and a match carrying portion 3. The portion 3 has a book of matches E stapled or otherwise secured thereto at 4. The ignitable ends 5 of the matches project beyond the end 6 of the match carrying portion 3.

A tear line 7 extends across the match carrying portion and is disposed a slight distance from the base 8 of the book of matches. The purpose of this tear strip or score line is to permit the supporting structure for the pack of matches E, to be removed from the flap 3 when the last match has been used, or should the person wish to make use of the main body A as an envelope to send to the advertiser, he may remove the pack E along the line 7 before all of the matches have been used. Figure 2 also shows a strip 9 of adhesive material bordering the perforated line 7 and this strip of adhesive is used for sealing the folded body A in a manner hereinafter described.

An expandible envelope F is provided on the inner surface 10 of the back portion 2, see Figures 2 and 10, and the base 11 of the envelope extends over a portion of the lower flap 3. The envelope may be made from an extra sheet of paper, slightly smaller than the body A of the book, and the paper may be attached to the body on three sides by gluing or stapling. The top of the envelope F extends over the top flap 17 of the body A a slight distance. It will be seen from Figure 3 that the sides of the envelope are creased or folded as at 12 and 13 so as to permit the envelope to be enlarged according to the amount of material slipped into its interior. The back portion 2 of the body A forms the rear of the envelope. Again referring to Figure 2, it will be seen that the top of the envelope is provided with a flap 14 that may be gummed on its under surface. A perforated tear line 14a extends along the flap to permit the envelope F to be opened by severing along this line.

Figure 4 indicates how the base 11 of the envelope is secured to the back portion 2 of the body A and further shows how the flap 14 can be swung into open position, as indicated by the dot dash line, for the purpose of placing the desired material into the envelope interior. When the flap 14 is in extended position, it will overlie an adhesive strip 15 applied to the inner surface of the main body A. The adhesive strip is disposed adjacent to a fold line 16 that permits a top flap 17 to be folded down over the bottom flap 3 when the main body A is folded into closed position along its lines 1 and 16. Figure 1 illustrates the top flap 17 when folded, overlying a portion of the lower folded flap 3.

The envelope F could have the name of an advertiser printed in the rectangle area 18 shown in Figure 2. The top flap 17 of the body A has two sections, an outer one 17a and an inner one 17b, separated by the adhesive strip 15. The purpose of the two sections is to permit a two-way mailing of the main body A in a manner hereinafter explained. In order to secure the top flap 17 to the bottom flap 3 when the two are in folded position, as shown in Figure 1, I provide an adhesive strip 20 on the inner surface of the top flap 17 and adjacent to its outer edge and this strip will cause the top flap to adhere to the bottom one. When the main body A is to be sent through the mail, it is preferable that the foldable envelope B be removed as well as the backing C. In addition to this the book of matches E will be removed from the lower flap 3 by severing along the scored line 7.

The expandible envelope F provided in the main body A may be used as the main or auxiliary envelope for reply purposes and is designed to receive a letter or any contribution if the main body A is used for the sending of small articles, or is used for receiving coins or checks for charity purposes. The envelope may also be used to receive additional order blanks, contest forms, subscription slips, etc. The flap 14 of the envelope F can be sealed shut by causing it to adhere to the adhesive strip 15. The flap 14 has a tear line 14a to permit the envelope F to be opened. If desired a message can be written on the envelope F and if the person does not have a pencil or pen, the flap A1 can be folded along the fold line 21 so as to place a carbon paper portion 22 over the envelope. The non-ignitable end of one of the matches E can now be used as the writing instrument and the carbon paper will transfer the written message to the envelope.

Again referring to Figure 6, which shows the outer surface of the main body A, it will be seen that where the back portion 2 joins the match carrying portion 3, I provide a roughened striker surface 38 for igniting matches E when the ignitable ends are drawn thereacross. The striker surface is placed at the fold line 1 so that a portion of it extends on to the back 2 while the remaining portion extends on to the match carrying flap 3. The striking surface 38 is placed on the outer side of the main body A so as to prevent any likelihood of the matches being ignited accidentally when they are folded within the package.

It will also be seen from Figure 6 that the top flap 17 of the main body A has two areas; an outer one at 17a and an inner one at 17b. Each area 17a and 17b is provided with a rectangular outline 39a and 39b, respectively, for designating where a stamp is to be placed. This construction adapts the main body A to be used as a two-way envelope when the foldable envelope B and backing C are removed. The pack of matches E is also removed along the tear line 7 before the main body A is mailed.

When the top flap 17 is folded over the previously folded bottom flap 3, a postage stamp is placed on the rectangular area 39a in the manner shown in Figure 1. The window 19 may expose the return address of the sender which is actually printed on the outer surface of the portion of the lower flap 3 that registers with the window when the parts are folded as in Figure 1. The adhesive strip 20 on the top flap 17 is used for sealing the envelope and this strip will cause the top flap to adhere to the bottom flap.

When the one receiving the envelope desires to remail it, he reverses the order of folding the top and bottom flap so that the bottom flap 3 will now overlie a portion of the top flap 17 and will cover the rectangular area 39a and thus cover the previously canceled stamp. The person returning the envelope can place the stamp on the other rectangular area 39b. The adhesive strip 9 is used for sealing the bottom flap on the top flap. The outer flap portion 17a could be severed along the tear line 17c and the remaining flap portion 17b, secured in place by the gummed strip 15.

Removable envelope blank

It is desirable that the foldable envelope blank B be detached from the flap A1 along the tear line 23 before the main body A with its expansible envelope F is used. It is further desirable that the backing C be detached from the flap A2 along the tear line 24 before the main body A is folded and sent through the mail. I will now describe the construction of the removable envelope blank B and then describe the backing C and its removable and mailable objects D. The removable envelope B is shown in Figures 2, 6, 7 and 8. In Figure 7, the envelope blank is shown detached from the main body A and the blank itself has a main body portion 25 with side flaps 26 and 27 hinged thereto along fold lines 28 and 29, respectively. In addition, the envelope blank has a top flap 30 and a bottom flap 31, both being foldable along the fold lines 32 and 33, also indicated in Figure 7. The inner surface of the main body 25 may be used on which to write a message or a letter may be written on a separate piece of paper and placed within the folded envelope.

In Figure 8, I show the envelope in a folded position with the flaps 26 and 27 extending inwardly and the bottom flap 31 folded and overlying these flaps. The envelope may be sealed shut by folding the top flap 30 over a portion of the bottom flap 31 and the gummed strip 34 on the inner surface of the top flap will adhere to the outer surface of the folded bottom flap 31. In the development view of the outer surface of the foldable envelope B shown in Figure 6, I show the top flap 30 provided with a rectangular area 35 for receiving a stamp. When the top flap 30 overlies a portion of the folded bottom flap 31, the rectangular area 36 on the bottom flap would be covered and the stamp will be affixed to the rectangular area 35.

The envelope is designed for being returned by mail by the one receiving it. The return mailing of the envelope is made possible by first folding the top flap 30 down upon the folded side flaps 26 and 27 and then folding the bottom flap 31 over a portion of the top flap. The bottom flap will now cover the rectangular area 35 on the top flap to cover the stamp affixed thereto and the adhesive strip 37 on the inner surface of the bottom flap, see Figure 7, is used for sealing the envelope. A stamp is applied to the rectangular area 36.

When it is not advisable to go to the expanse of placing gummed strips 34 and 37 on the flaps 30 and 31 of the envelope blank in Figure 7, the flaps may be so arranged that the side flaps 26 and 27 and the upper and lower flaps 30 and 31, meet each other when folded and a postage stamp can be used as the envelope sealing means. This arrangement of having the two side flaps and the upper and lower flap meet either in the center of the envelope or at its side would also permit a sticker or small label to be used as the sealing means rather than the postage stamp.

Removable backing member

I will now explain the structure of the removable backing member C to which are removably secured the mailable objects such as the postal card D. Referring to Figure 2, it will be seen that the inner surface of the backing member C is provided with a U-shaped adhesive strip portion 40 that parallels the edges of and is disposed adjacent to three of the sides of the member C. This U-shaped strip portion also borders the mailable object D so as not to interfere with it. In Figures 2 and 5, I show how the mailable object D is secured to the backing member C by the tab 41 that is attached to the flap A2. The object D may be removed from the tab 41 by tearing along a tear line 41a. I further show in Figure 5 how the reply card D can be swung into the dot dash line position about its tear line 41a, preparatory to severing the card from its backing member.

It is possible before removing the member D, to swing it about its tear line 41a as a hinge so that the opposite side of the member will be facing uppermost when the member overlies the envelope F in Figure 2. It is then possible to swing the carbon-coated side flap A1 over the surface of the member D and then use the non-ignitable end of one of the matches E as a writing instrument to write on the member D any data desired. In this way the member D can be used even though the one using the member be without a pen or pencil. After the writing through the carbon is accomplished, the member D can be removed and mailed to the address of the advertiser.

Although I have shown by way of example, a postal card attached to the backing member C, it should be understood that any type of mailable article may be removably secured to the backing and a plurality of such items may be attached to the same backing member. This will give the person a choice of mailing one or more of the items to the same advertiser or to different advertisers as the case may be. The mailable objects can take the shape of foldable envelopes or collapsible containers, etc. They may be attached at their inner ends to the flap A2 in the same manner as the member D is attached along the tear line 41a. The three unattached edges of the member D may be secured to the backing member C, by folding over the gummed strip portions 40 that border the member. These folded over gummed strip portions 40 would retain not only the member D, but any additional mailable members (not shown) that might be attached to the backing C.

The backing member C and the member D are foldable along the line 40a while still attached to the flap A2 so as to permit the folded members to be received within the interior of the main body A when the latter is folded as in Figure 1. The foldable envelope B is also foldable along its fold lines 28, 29, 32 and 33 and then is folded along its attaching line 23 so as to be received within the interior of the main body when the flap A1 is folded into the interior of the main backing A. In this way the entire device is self-contained and can be readily picked up by one who desires to make use of the matches.

It is possible to mail the main body A as second-class matter after the members B, C, D and E are removed. When this is done, the side flap A1 is folded over the previously folded bottom flap 3, see Figure 10, and then the top flap 17 is brought down upon the side flap A1. The outer portion 17a of the top flap is torn along the tear line 17c. In Figures 9 and 10, I show the side flap A1 as being cut along an angular line 42 so as to provide a tongue 43 that will receive the outer edge 17c of the top flap 17. The tongue is strong enough in structure to hold the top flap 17 in folded position and when the tongue is used, the adhesive strip 15 is not used for sealing purposes. The folded main body A when arranged in this manner can be sent through the mail as second class matter.

I have already described how the body A can be mailed twice by using the top flap portion 17a and then in the second mailing, using the inner top flap portion 17b, the outer one 17a being covered by the lower flap 3. It is possible for the addressee to tear the top flap portion 17a along the tear line 17c when receiving the folded body A in order to open it. Then when the addressee wishes to return the envelope A, the next flap portion 17b can be used and the adhesive strip 15 is utilized for securing the flap in sealed position. The expandible envelope F, housed within the folded body A would have its flap 14 folded out of the way.

It is therefore possible to fold and seal the body A on the return mailing to cover up the postal cancellation on the outer portion 17a of the top flap 17, or to remove this portion entirely along the tear line 17c. The side flaps A1 and A2 are used to enclose the sides of the folded body or envelope A.

While I have shown only the preferred form of my invention, it should be understood that various changes or modifications may be made within the scope of the appended claims without departing from the spirit and scope of the invention.

I claim:

1. A device of the type described comprising a main body; a side flap integral with the main body; a removable and mailable object carried by the side flap and being foldable into a position overlying the main body; and a second side flap integral with the main body and being disposed on the opposite side from the first mentioned side flap; said second flap having a carbon coated portion adapted to overlie the mailable object when the latter is folded over the main body and the second side flap is folded thereover; whereby data may be inscribed on the mailable object when tracing a writing instrument over the carbon coated portion of the second side flap.

2. In a two-way mailing device of the type described; a main body having a center portion and top and bottom flaps; the top flap having a tear line dividing it into an outer and an inner portion with a postage stamp receiving area on each portion; a gummed strip on the inner surface of the outer portion for causing the top flap to be secured to the folded bottom flap for initial mailing; the outer portion of the top flap being removable from the bottom flap for return mailing; the center portion having a side flap foldable to overlie the folded bottom flap and to extend under the shortened top flap; said side flap having a notch for receiving a part of the folded top flap, the notch defining a retaining tab for engaging with the top flap for holding it in closed position.

MORTON COVAN.

REFERENCES CITED

The following references are of record in the file of this patent:

UNITED STATES PATENTS

| Number | Name | Date |
|---|---|---|
| 673,399 | Koester | May 7, 1901 |
| 877,330 | Harvey | Jan. 21, 1908 |
| 1,453,015 | Lavigne | Apr. 24, 1923 |
| 1,722,465 | Gray | July 30, 1929 |
| 2,157,740 | Quinlan | May 9, 1939 |
| 2,349,438 | Dement | May 23, 1944 |

FOREIGN PATENTS

| Number | Country | Date |
|---|---|---|
| 63,240 | Switzerland | Feb. 27, 1913 |